United States Patent [19]

Brammer et al.

[11] Patent Number: 4,900,066

[45] Date of Patent: Feb. 13, 1990

[54] PIPE CONNECTOR

[75] Inventors: Norman Brammer, Fyvie Turriff, Scotland; Philippe C. Nobileau, Paris, France

[73] Assignee: Vetco Gray Inc., Houston, Tex.

[21] Appl. No.: 265,736

[22] Filed: Nov. 1, 1988

[51] Int. Cl.$^4$ ............................................. H16L 55/00
[52] U.S. Cl. ..................................... 285/92; 285/392; 285/90
[58] Field of Search ...................... 285/392, 90, 91, 92; 411/209, 221, 294, 940

[56] References Cited

U.S. PATENT DOCUMENTS

| | | |
|---|---|---|
| 2,849,245 | 8/1958 | Baker . |
| 3,107,930 | 10/1963 | Gibbs et al. . |
| 3,345,084 | 10/1967 | Hanes et al. . |
| 4,601,491 | 7/1986 | Bell, Jr. et al. . |
| 4,607,865 | 8/1986 | Hughes . |
| 4,610,465 | 9/1986 | Boyadjieff . |
| 4,655,479 | 4/1987 | Farr ................................. 285/92 X |
| 4,681,166 | 7/1987 | Cuiper ............................. 285/392 X |
| 4,717,183 | 1/1988 | Nobileau . |

OTHER PUBLICATIONS

Vetco Gray, 1986, "Squnch Joint Connectors . . . ".

Primary Examiner—Dave W. Arola
Attorney, Agent, or Firm—James E. Bradley

[57] ABSTRACT

A pin and box connection for connecting tubular members together utilizes a split sleeve. The split sleeve is carried on one of the members and has the ability to retract. This allows the members to be snapped together without rotation. The split sleeve is threaded, and the threads ratchet over each other when snapped together. A locking pin is located in one of the members for engaging a longitudinal slot in the other member. The locking member prevents the members from rotating to unscrew once snapped together. The locking pin can be removed to allow the members to be unscrewed from each other.

7 Claims, 2 Drawing Sheets

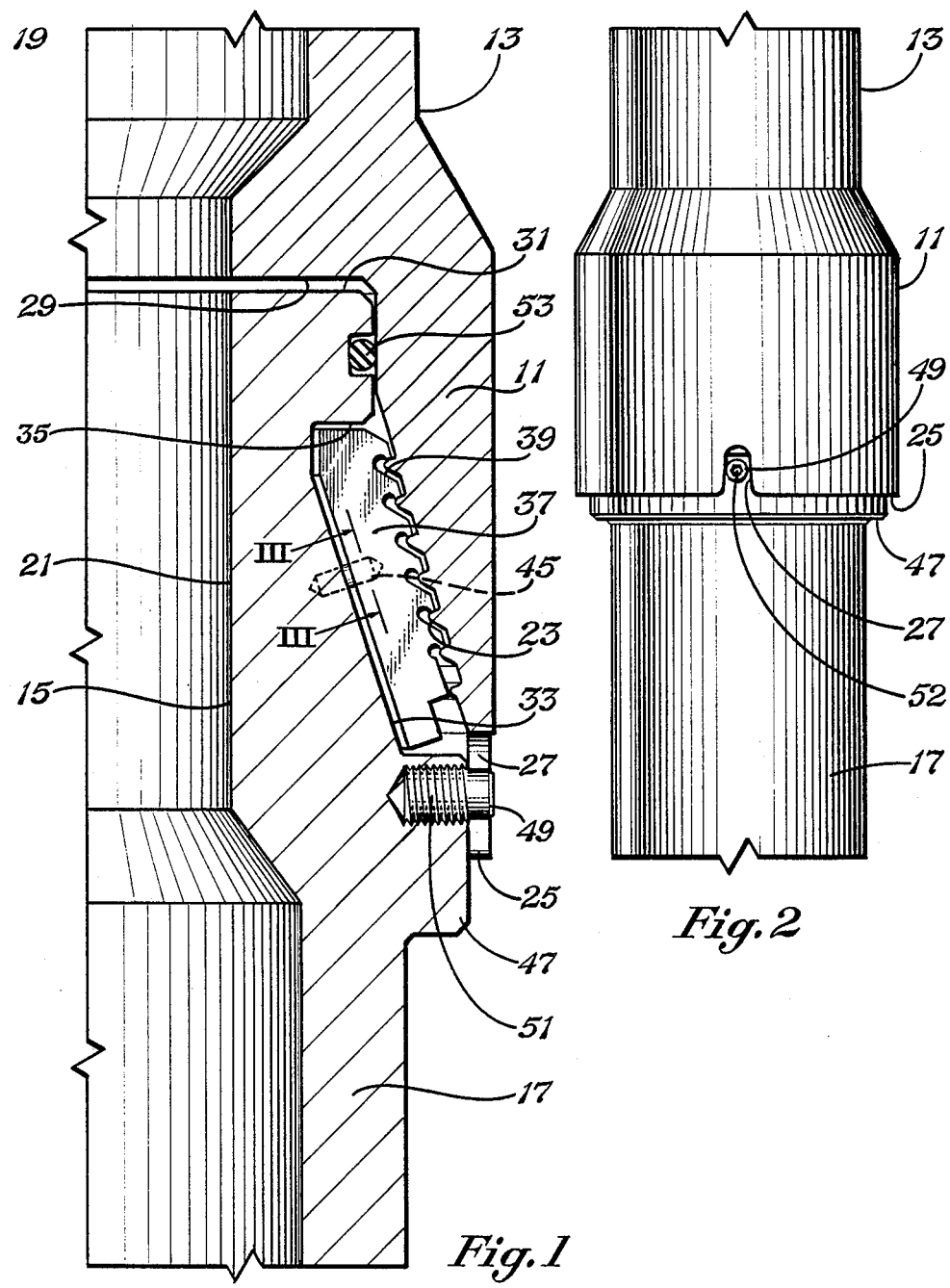

PIPE CONNECTOR

BACKGROUND OF THE INVENTION

1. Field of the Invention:

This invention relates in general to threaded connectors on pipe members, and in particular to a connector that allows a rapid make-up for use in offshore drilling.

2. Description of the Prior Art:

In offshore drilling, large diameter pipes are used for various purposes, such as well conductors and pilings. Often, it is necessary to make-up the connection quickly, because the vessel may be rising and falling due to wave motion. In one type of connector, rather than threads, circumferential grooves are formed on conical pin and box members. The members are snapped together using hydraulic force. In another type, a split ring is contained on a pin member for snapping into a groove in the female member.

In another type, multiple start threads are formed on the connectors, each with a separate start. The joint makes up in less than one full turn. Locking tabs are bent inward to lock the members together after make-up. In still another type, helical threads are contained on the members, but the members are snapped together without rotation. The threads allow the members to be disconnected by rotation.

While the connectors described above are workable, in some of the types, the force required to snap them together is substantial. Also, some of the connectors described above are difficult to disconnect. The pipes that use the various types of connectors described above are normally not disconnected often. However, on occasion, disconnecting is necessary.

SUMMARY OF THE INVENTION

In this invention, the connector uses pin and box members which mate together. One of the members has a threaded section formed in it. The other member carries a split sleeve. The split sleeve has a threaded section which mates with the threaded section on the other member. The sleeve is retractable so that the threaded section will ratchet and snap together when the members are inserted together.

The sleeve has means, preferably a retaining pin, for preventing rotation of the sleeve on the member on which it is carried. Also, a locking pin is carried by one of the members and positioned to engage a slot formed in the other member. When the members are inserted together, the pin enters the slot and prevents rotation of the members relative to each other. The pin is threaded so that it can be removed. Once removed, the members can be rotated to unscrew the threaded sections from each other.

BRIEF DESCRIPTION OF THE DRAWINGS

FIG. 1 is a partial vertical sectional view illustrating a connector constructed in accordance with this invention.

FIG. 2 is a side elevational view of the connector of FIG. 1.

DESCRIPTION OF THE PREFERRED EMBODIMENT

Figure 3:
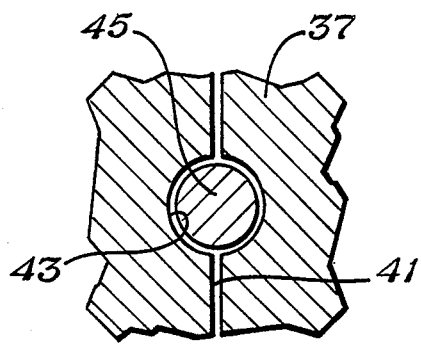
FIG. 3 is a partial sectional view of the connector of FIG. 1, taken along the line III—III of FIG. 1.
Figure 5:
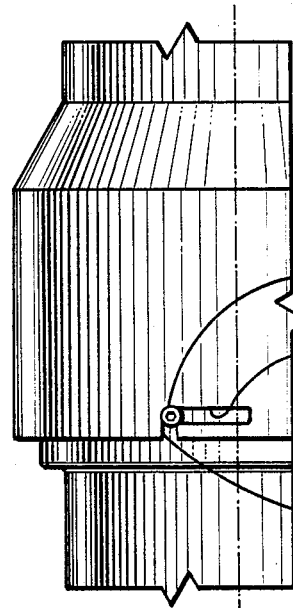
FIG. 5 is a side view of the connector of FIG. 4.

Referring to FIG. 1, box member 11 is a female member which is attached to a tubular element such as pipe 13. Pine member 15 is a male member attached to a tubular element such as pipe 17. Pipe 13 has an axial passage 19 that is coaxial with a passage 21 extending through pipe 17.

A set of threads 23 are formed in the box 11. In the preferred embodiments, threads 23 are constructed as shown in U.S. Pat. No. 4,717,183, issued Jan. 5, 1988, Philippe G. Nobileau, all of which material is hereby incorporated by reference. These threads are of a multiple start type. That is, there are a plurality of individual threads, each starting from the lower end. As a result, the connectors will make-up in less than one full turn. The threads 23 define corresponding points of a frusto-conical surface of revolution in the preferred embodiments. The threads 23 are right-hand so that they make-up with right-hand rotation.

Box 11 has a lip 25 on its lower end. A slot 27 is formed in the lip 25. As shown in FIG. 2, slot 27 extends longitudinally upward a short distance on the lip 25.

An internal downward facing shoulder 29 is formed within the box 11. Shoulder 29 is adapted to contact during make-up a rim 31 located on the upper end of the pin member 15. A frusto-conical surface 33 is formed on the pin member 15. The conical surface 33 has the same taper or inclination as the angle of inclination of the threaded section 23 on the box 11. A downward facing shoulder 35 is located above the conical surface 33.

A metal split sleeve 37 locates on the conical surface 33. Sleeve 37 has in the embodiment of FIGS. 1–3 a smooth, frusto-conical interior that contacts the conical surface 33 on the pin member 15. Sleeve 37 has a set of right-hand threads 39 on the exterior that are the same configuration as the threads 23.

As shown in FIG. 3, a split 41 is formed in the sleeve 37. A circular recess 43 is formed in both side edges of the split 41. A retaining pin 45 is secured in the pin member 15 and protrudes outward into the split 41 within the recess 43. Retaining pin 45 prevents the sleeve 37 from rotating.

The dimensions of the sleeve 37 are selected so that in the relaxed state, there will be a clearance between the interior of the sleeve 37 and the conical surface 33. The sleeve 37 will retract when the box 11 is inserted over it, with the split 41 closing. The box threads 23 will contact the sleeve threads 39 and ratchet downward as the sleeve 37 contracts. The contraction of sleeve 37 does not create a permanent deformation in the sleeve 37, rather the deflection is less than the yield point.

A circumferential band 47 extends around the pin member 15 immediately below the sleeve 37. A locking pin 49 extends outward through the band 51. Locking pin 49 has thread 51 which secure it within a hole in the band 47. As shown in FIG. 2, a socket 51 in the head of the locking pin 49 allows it to be unscrewed to be removed from the pin member 15. Locking pin 49 extends radially from the pin member 15 and is positioned to engage the slot 27 formed in the lip 25 of the box member 11. A seal 53 is located in a groove in the end of pin member 15 for engaging the interior of the box 11 to provide sealing.

In operation, to secure the box member 11 to the pin member 15, the members 11, 15 are inserted together without rotation. The threads 23 will contact the threads 39. The sleeve 37 will contract and the threads 23 will ratchet over the threads 39 until the shoulder 29 contacts rim 31. At this point, the threads 23, 39 will be fully in engagement. The slot 27 will slide over the locking pin 49.

Later, if it is desired to separate the box member 11 from the pin number 15, a wrench will be inserted into the socket 52 (FIG. 2) to unscrew the locking pin 49. The threads 51 in the socket 52 serve as releasing means for removing the locking pin 49. Then, the box member 11 is rotated to the left. The thread 23, 39 will unscrew from each other. In the preferred embodiment, because of the multiple threads within the threaded sections, they will unscrew in less than one full turn.

Figure 4:
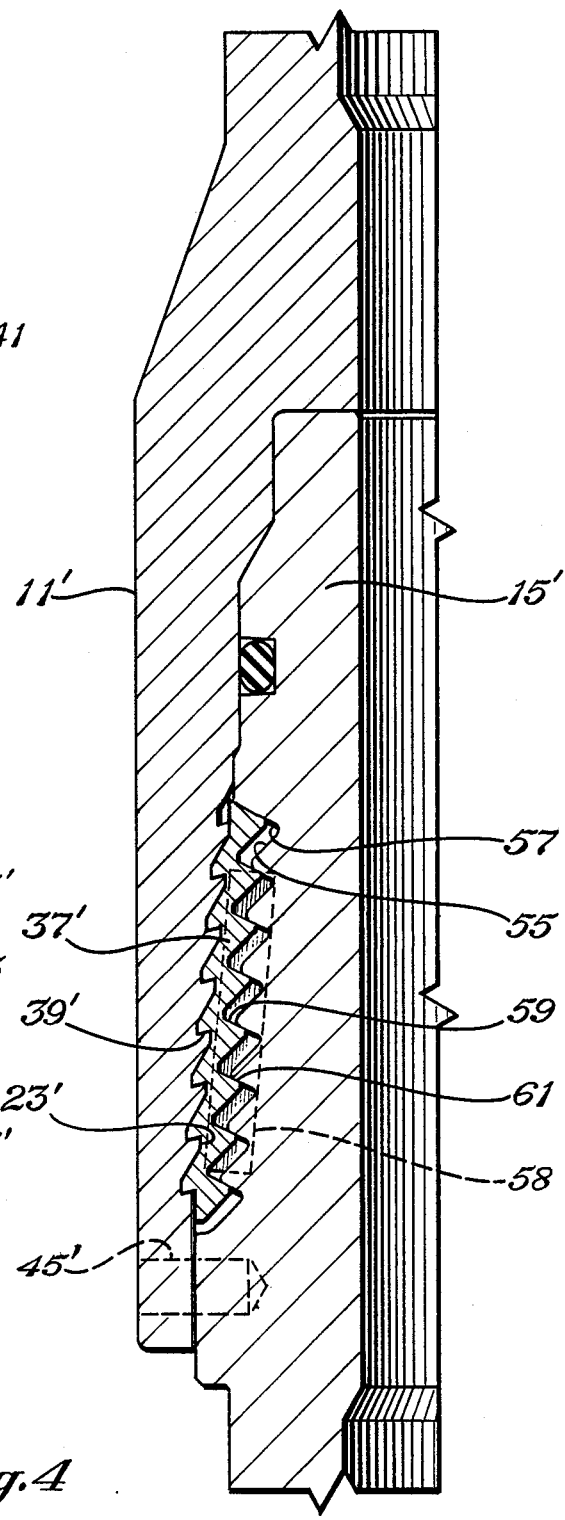
FIG. 4 is an alternate embodiment of a connector constructed in accordance with this invention.

In the embodiment of FIG. 4, the pin member 15' has a plurality of circumferential grooves 55 formed on it. Each of the grooves 55 has a downward facing load shoulder 57. The grooves 55 are in a general saw-tooth shape, with the load shoulders 57 inclining relative to the longitudinal axis of the pin member 15'. The grooves 55 are not threads, rather each groove 55 is in a plane perpendicular to the longitudinal axis of the pin member 15.

Similarly, the sleeve 37' has a plurality of mating grooves 59 on its interior. Grooves 59 each have an upward facing load shoulder 61 to engage the load shoulder 57. A rectangular key 58 is secured in a slot in pin 15' and extends into the split (not shown) of the sleeve 37'. Key 58 prevents any rotation of the sleeve 37' on the pin 15'.

Sleeve 37' has right-hand threads 39' on its exterior that may be the same type as threads 39 of FIG. 1. Threads 39' engage threads 23' in the box 11'.

Locking pin 45' engages a slot 27'. The slot 27' could be only a vertical slot as slot 27' in FIG. 2, which prevents all rotation of the box 11 on pin 15 once stabbed. Alternately, the slot 27 in FIG. 2, as well as the slot 27' in FIG. 4, could have a lateral section 63 which extends circumferentially a selected distance from the longitudinal portion of slot 27'. The lateral section 63 allows the box 11' to rotate to the right on pin 15' a short distance after stabbing. This screws the box 11' downward relative to the sleeve 37' and pin 15' to further tighten the connection. Even with the lateral section 63, to disengage the box 11' from the pin 15', the pin 45' must be removed as its prevents sufficient left-hand rotation to unscrew the box 11' from the pin 15'.

When tension is applied to the box 11' and pin member 15', the force is transmitted through the multiple load shoulders 61 and 57. This spreads the load. In the embodiment of FIG. 1, the tension load is transmitted only through the shoulder 35.

The invention has significant advantages. The box member 11 is secured to the pin member 15 without any substantial axial force and without any rotation. The members easily snap together because of the ability of the threaded sleeve 37 to retract. The members are easily separated from each other by removing the locking pin. This allows the members to be unscrewed in less than one full turn if the threads used are of a multiple start type.

While the invention has been described in only two of its forms, it should be apparent to those skilled in the art that it is not so limited, but is susceptible to various changes without departing from the scope of the invention.

I claim:

1. A connection means for connecting two tubular elements, comprising in combination:
   pin and box mateable members, each connected to one of the tubular elements;
   one of the members having a right-hand threaded section formed thereon;
   a sleeve;
   means for mounting the sleeve on the other of the members and for preventing axial movement of the sleeve relative to said other of the members, the sleeve having a right-hand threaded section formed thereon for mating with the threaded section of said one member to connect the members together;
   means including a split in the sleeve for allowing the sleeve to retract to cause the threaded sections to snap into each other as the members are inserted together without rotation;
   means for preventing rotation of the sleeve on the member on which the sleeve is carried; and
   locking means for preventing left-hand rotation of the members relative to each other once the threaded sections have engaged each other, the locking means being actuable automatically once the threaded sections snap into each other, the locking means being selectively releasable to allow one of the threaded sections to rotate in left-hand rotation to unscrew from the other.

2. A connection means for connecting two tubular elements, comprising in combination;
   pin and box mateable members, each connected to one of the tubular elements;
   the box member having a threaded section formed therein;
   a sleeve;
   means for mounting the sleeve on the pin member and for preventing axial movement of the sleeve relative to the pin member, the sleeve having a threaded section formed thereon for mating with the threaded section of the box member to connect the members together;
   means including a split in the sleeve for causing the sleeve to contract and for allowing the threaded sections to engage each other as the members are inserted together without rotation;
   means for preventing rotation of the sleeve on the pin member;
   a slot extending longitudinally on one of the members;
   a locking pin carried by the other of the members and positioned to protrude radially from the member on which the locking pin is carried to engage the slot as the members are inserted together without rotation; and
   means for removing the locking pin from the member on which the locking pin is carried, to enable the members to rotated relative to each other to unscrew the threaded sections from each other.

3. A connection means for connecting two tubular elements, comprising in combination:
   pin and box mateable members, each connected to one of the tubular elements;
   the box member having a threaded section formed therein;
   a sleeve;
   means for mounting the sleeve on the pin member and for preventing axial movement of the sleeve relative to the pin member, the sleeve having a threaded section formed thereon for mating with the threaded section of the box member to connect the members together;

means including a split in the sleeve for causing the sleeve to contract for allowing the threaded sections to ratchet over each other as the members are inserted together without rotation;

means for preventing rotation of the sleeve on the pin member;

the box member having a lip on its lower end with a slot extending longitudinally from the lip;

a locking pin carried by the pin member below the sleeve and positioned to protrude radially from the pin member to engage the slot as the members are inserted together without rotation; and the locking pin being threaded into the pin member for allowing the locking pin to be removed from the pin member, to enable one of the members to be rotated relative to the other to unscrew the threaded sections from each other.

4. A connection means for connecting two tubular elements, comprising in combination:

pin and box mateable members, each connected to one of the tubular elements;

one of the members having a right-hand threaded section formed thereon;

a sleeve;

means for mounting the sleeve on the other member and for preventing axial movement of the sleeve on the other member, the sleeve having a right-hand threaded section formed thereon for mating with the threaded section of said one member to connect the members together;

means including a split in the sleeve for causing the sleeve to retract for allowing the threaded sections to snap into engagement with each other as the members are inserted together without rotation;

means for preventing rotation of the sleeve on the member on which the sleeve is carried;

the box member having a lip on its lower end with a slot having a longitudinal portion extending longitudinally from the lip, the slot having a lateral portion extending circumferentially from the longitudinal portion a selected distance;

a locking pin carried by the pin member below the sleeve and positioned to protrude radially from the pin member to engage the slot as the members are inserted together without rotation, the members being rotatable a selected distance relative to each other in a right-hand direction to tighten the threaded sections together, the pin moving from the longitudinal portion to the circumferential portion during said right-hand rotation; and the locking pin being threaded into the pin member for allowing the locking pin to be removed from the pin member, to enable one of the members to rotated relative to the other in a left-hand direction to unscrew the threaded sections from each other.

5. A connection means for connecting two tubular elements, comprising in combination;

pin and box mateable members, each connected to one of the tubular elements;

one of the members having a threaded section formed thereon;

a sleeve;

means for mounting the sleeve on the other of the members and for preventing axial movement of the sleeve on the other of the members, the sleeve having a conical exterior with a threaded section formed thereon for mating with the threaded section of said one member to connect the members together, each threaded section having a plurality of threads having corresponding points forming an axially extending frusto-conical surface of revolution;

means including a split in the sleeve for making the sleeve retractable for allowing the threaded sections to snap over and engage each other as the members are inserted together without rotation;

means for preventing rotation of the sleeve on the member on which the sleeve is carried; and locking means for preventing left-hand rotation of the members relative to each other once the threaded sections have engaged each other, the locking means being actuable automatically once the threaded sections snap into each other, the locking means being selectively releasable to allow on of the threaded sections to rotate in left-hand rotation to unscrew from the other.

6. A connection means for connecting two tubular elements, comprising in combination;

pin and box mateable members, each connected to one of the tubular elements;

one of the members having a right-hand threaded section formed thereon;

a sleeve;

means for mounting the sleeve on ,the other of the members and for preventing axial movement of the sleeve on the other of the members, the sleeve having on one side a right-hand threaded section formed thereon for mating with the threaded section on said one member to connect said means for mounting and preventing movement including the members together, the sleeve having on an opposite side a plurality of circumferential grooves formed therein which mate with corresponding grooves formed on the member which carries the sleeve;

means for causing the sleeve to retract for allowing the threaded sections to snap over and engage each other as the members are inserted together without rotation;

means for preventing rotation of the sleeve on the member on which the sleeve is carried;

locking means carried by the members for preventing sufficient left-hand rotation of the members relative to each other to unscrew the threaded sections from each other once the members are connected together by the threaded sections; and releasing means cooperating with the locking means for selectively releasing the locking means to allow one of the members to be rotated in a left-hand direction relative to the other to unscrew the threaded sections from each other.

7. A connection means for connecting two tubular elements, comprising in combination:

pin and box mateable members, each connected to one of the tubular elements;

one of the members having a threaded section formed thereon;

a sleeve;

means for mounting the sleeve on the other of the member and for preventing axial movement of the sleeve on the other of the members, the sleeve having on one side a threaded section formed thereon for mating with the threaded section of said one member to connect the members together, each threaded section having a plurality of threads having corresponding points forming an axially extending frusto-conical surface of revolution, said means for mounting and preventing movement including the sleeve having on an opposite side from the threaded section a plurality of circumferential grooves formed therein which mate with corresponding grooves formed on the member which carries the sleeve, the grooves being generally saw-toothed in configuration and having engaging load flanks which incline relative to a longitudinal axis of each member;

means, including a split in the sleeve, for causing the sleeve to retract for allowing the threaded sections to ratchet over each other as the members are inserted together without rotation; and means for preventing rotation of the sleeve on the member on which the sleeve is carried.

* * * * *

UNITED STATES PATENT OFFICE
CERTIFICATE OF CORRECTION

Patent No. 4,900,066          Dated February 2, 1990

Inventor(s) Norman Brammer, et al

It is certified that error appears in the above-identified patent and that said Letters Patent is hereby corrected as shown below:

At column 2, line 6, "pine" should be --pin--;

At column 2, line 13, "G." should be --C.--;

At column 3, line 7, "number" should be --member--;

At column 3, line 11, "thread" should be --threads--;

At column 3, line 47, "its" should be --it--;

At column 5, line 56, before the word "rotate", insert --be--;

At column 6, line 18, the word "on" should be --one--;

At column 6, line 33, after "connect" insert --the members together,--;

At column 6, lines 34 and 35, the words "the members together," should be deleted.

Signed and Sealed this

Seventh Day of April, 1992

Attest:

HARRY F. MANBECK, JR.

*Attesting Officer*        *Commissioner of Patents and Trademarks*